United States Patent
Mizushima

(10) Patent No.: US 11,945,263 B2
(45) Date of Patent: Apr. 2, 2024

(54) PNEUMATIC TIRE

(71) Applicant: The Yokohama Rubber Co., LTD., Tokyo (JP)

(72) Inventor: Haruna Mizushima, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 412 days.

(21) Appl. No.: 17/257,155

(22) PCT Filed: Feb. 14, 2019

(86) PCT No.: PCT/JP2019/005418
§ 371 (c)(1),
(2) Date: Dec. 30, 2020

(87) PCT Pub. No.: WO2020/008674
PCT Pub. Date: Jan. 9, 2020

(65) Prior Publication Data
US 2021/0276370 A1    Sep. 9, 2021

(30) Foreign Application Priority Data

Jul. 3, 2018 (JP) ................................. 2018-127005
Oct. 4, 2018 (JP) ................................. 2018-189107

(51) Int. Cl.
*B60C 11/12* (2006.01)
*B60C 11/13* (2006.01)
*B60C 11/03* (2006.01)

(52) U.S. Cl.
CPC ...... *B60C 11/1392* (2013.01); *B60C 11/1236* (2013.01); *B60C 11/0304* (2013.01); *B60C 2011/0381* (2013.01)

(58) Field of Classification Search
CPC ............ B60C 11/0304; B60C 11/0306; B60C 11/0309; B60C 11/042; B60C 11/045;
(Continued)

(56) References Cited

U.S. PATENT DOCUMENTS 5,031,680 A * 7/1991 Kajikawa ............... B60C 11/033
152/902
5,420,170 A   5/1995 Lutter et al.
(Continued)

FOREIGN PATENT DOCUMENTS

CN    101186168 A    6/2008
CN    104842718 A    8/2015
(Continued)

OTHER PUBLICATIONS

English machine translation of JP2002059711. (Year: 2002).*

*Primary Examiner* — Robert C Dye
(74) *Attorney, Agent, or Firm* — Thorpe North & Western

(57) ABSTRACT

In a pneumatic tire, a land portion includes a chamfered portion formed on an edge portion of the land portion on a ground contact edge side, and a lug groove and a narrow groove disposed correspondingly to the chamfered portion. The chamfered portion is formed on the edge portion on a ground contact edge side, and has a chamfered width that increases toward a circumferential direction in the road contact surface of the land portion. The lug groove terminates in the land portion on one end, and is opened to a central portion of the chamfered portion in a longitudinal direction on the other end. The narrow groove is opened to an edge portion of the land portion on an equatorial plane side on one end, and terminates in the vicinity of a maximum width position of the chamfered portion on the other end.

15 Claims, 10 Drawing Sheets

(58) Field of Classification Search
CPC ............. B60C 11/1315; B60C 11/1323; B60C 11/1384; B60C 11/1392; B60C 2011/0381; B60C 2011/133
See application file for complete search history.

(56) References Cited

U.S. PATENT DOCUMENTS

| | | | |
|---|---|---|---|
| 9,085,201 B2 | 7/2015 | Horiguchi | |
| 9,346,323 B2* | 5/2016 | Sakamoto | B60C 11/0306 |
| 9,505,272 B2 | 11/2016 | Chambriard et al. | |
| 2004/0256040 A1* | 12/2004 | Ratliff, Jr. | B60C 11/0306 |
| | | | 152/DIG. 3 |
| 2005/0072505 A1* | 4/2005 | Takahashi | B60C 11/13 |
| | | | 152/209.15 |
| 2008/0121326 A1 | 5/2008 | Ohara | |
| 2010/0212792 A1* | 8/2010 | Mita | B60C 11/033 |
| | | | 152/209.9 |
| 2012/0060987 A1 | 3/2012 | Nemoto | |
| 2012/0285592 A1* | 11/2012 | Kameda | B60C 11/033 |
| | | | 152/209.8 |
| 2014/0238568 A1 | 8/2014 | Haga | |
| 2015/0231928 A1 | 8/2015 | Sato et al. | |
| 2016/0297251 A1* | 10/2016 | Takagi | B60C 11/0332 |
| 2017/0096034 A1 | 4/2017 | Taniguchi | |
| 2017/0210174 A1* | 7/2017 | Suga | B60C 11/00 |
| 2017/0305198 A1* | 10/2017 | Ichimura | B60C 13/02 |
| 2019/0023077 A1 | 1/2019 | Speziari et al. | |

FOREIGN PATENT DOCUMENTS

| | | | | |
|---|---|---|---|---|
| CN | 105764710 A | | 7/2016 | |
| CN | 107020891 A | | 8/2017 | |
| CN | 108430802 A | | 8/2018 | |
| DE | 10 2016 117 816 A | | 4/2017 | |
| EP | 2732985 | * | 5/2014 | |
| EP | 2 907 675 A2 | | 8/2015 | |
| EP | 3 078 507 A1 | | 10/2016 | |
| EP | 3 397 512 A1 | | 11/2018 | |
| JP | H4-117417 | | 4/1992 | |
| JP | 2002059711 | * | 2/2002 | |
| JP | 2004330812 A | * | 11/2004 | ........... B60C 11/125 |
| JP | 2008-126931 A | | 6/2008 | |
| JP | 4755709 B2 | | 8/2011 | |
| JP | 2012-56479 A | | 3/2012 | |
| JP | 2012-81806 A | | 4/2012 | |
| JP | 5629283 B2 | | 11/2014 | |
| JP | 2015-504808 A | | 2/2015 | |
| JP | 2015-120380 A | | 7/2015 | |
| JP | 2015-134581 A | | 7/2015 | |
| JP | 2015-136952 A | | 7/2015 | |
| JP | 2015-151024 A | | 8/2015 | |
| JP | 2015-160605 A | | 9/2015 | |
| JP | 2016-74386 A | | 5/2016 | |
| JP | 2017-71280 A | | 4/2017 | |
| JP | 2017-197145 A | | 11/2017 | |
| WO | WO2014/067686 | * | 5/2014 | |
| WO | WO2014/167990 | * | 10/2014 | |
| WO | WO2014/171353 | * | 10/2014 | |
| WO | 2015/093238 A1 | | 6/2015 | |
| WO | 2017/115195 A1 | | 7/2017 | |

* cited by examiner

|  | CONVENTIONAL EXAMPLE 1 | CONVENTIONAL EXAMPLE 2 | EXAMPLE 1 | EXAMPLE 2 |
|---|---|---|---|---|
| CHAMFERED PORTION | YES | YES | YES | YES |
| FIRST LATERAL GROOVE | - | - | NON-THROUGH LATERAL GROOVE | NON-THROUGH LATERAL GROOVE |
| SECOND LATERAL GROOVE | THROUGH LUG GROOVE | THROUGH NARROW GROOVE | NARROW GROOVE | NARROW GROOVE |
| Wc/Wb2 | 0.05 | 0.05 | 0.05 | 0.30 |
| Lc/Pc | 0.60 | 0.60 | 0.60 | 0.60 |
| D22/Wb2 | - | - | 0.20 | 0.20 |
| W22/Lc | - | - | 0.03 | 0.03 |
| θ22 deg | - | - | 60 | 60 |
| L22/Lc | 0.50 | 0.50 | 0.35 | 0.35 |
| W23/W22 | - | - | 0.10 | 0.10 |
| θ23 deg | 60 | 60 | 60 | 60 |
| DRY STEERING STABILITY PERFORMANCE | 90 | 100 | 98 | 95 |
| WET STEERING STABILITY PERFORMANCE | 110 | 100 | 110 | 113 |

FIG. 8A

| | EXAMPLE 3 | EXAMPLE 4 | EXAMPLE 5 | EXAMPLE 6 | EXAMPLE 7 | EXAMPLE 8 |
|---|---|---|---|---|---|---|
| CHAMFERED PORTION | YES | YES | YES | YES | YES | YES |
| FIRST LATERAL GROOVE | NON-THROUGH LATERAL GROOVE | NON-THROUGH LATERAL GROOVE | NON-THROUGH LATERAL GROOVE | NON-THROUGH LATERAL GROOVE | NON-THROUGH LATERAL GROOVE | NON-THROUGH LATERAL GROOVE |
| SECOND LATERAL GROOVE | NARROW GROOVE | NARROW GROOVE | NARROW GROOVE | NARROW GROOVE | NARROW GROOVE | NARROW GROOVE |
| Wc/Wb2 | 0.20 | 0.20 | 0.20 | 0.20 | 0.20 | 0.20 |
| Lc/Pc | 0.60 | 1.00 | 0.90 | 0.90 | 0.90 | 0.90 |
| D22/Wb2 | 0.20 | 0.20 | 0.20 | 0.80 | 0.50 | 0.50 |
| W22/Lc | 0.03 | 0.03 | 0.03 | 0.03 | 0.03 | 0.80 |
| θ22 deg | 60 | 60 | 60 | 60 | 60 | 60 |
| L22/Lc | 0.35 | 0.35 | 0.35 | 0.35 | 0.35 | 0.35 |
| W23/W22 | 0.10 | 0.10 | 0.10 | 0.10 | 0.10 | 0.10 |
| θ23 deg | 60 | 60 | 60 | 60 | 60 | 60 |
| DRY STEERING STABILITY PERFORMANCE | 97 | 100 | 99 | 94 | 96 | 94 |
| WET STEERING STABILITY PERFORMANCE | 112 | 109 | 110 | 115 | 113 | 115 |

FIG. 8B

| | EXAMPLE 9 | EXAMPLE 10 | EXAMPLE 11 | EXAMPLE 12 | EXAMPLE 13 | EXAMPLE 14 |
|---|---|---|---|---|---|---|
| CHAMFERED PORTION | YES | YES | YES | YES | YES | YES |
| FIRST LATERAL GROOVE | NON-THROUGH LATERAL GROOVE | NON-THROUGH LATERAL GROOVE | NON-THROUGH LATERAL GROOVE | NON-THROUGH LATERAL GROOVE | NON-THROUGH LATERAL GROOVE | NON-THROUGH LATERAL GROOVE |
| SECOND LATERAL GROOVE | NARROW GROOVE | NARROW GROOVE | NARROW GROOVE | NARROW GROOVE | NARROW GROOVE | NARROW GROOVE |
| Wc/Wb2 | 0.20 | 0.20 | 0.20 | 0.20 | 0.20 | 0.20 |
| Lc/Pc | 0.90 | 0.90 | 0.90 | 0.90 | 0.90 | 0.90 |
| D22/Wb2 | 0.50 | 0.50 | 0.50 | 0.50 | 0.50 | 0.50 |
| W22/Lc | 0.04 | 0.04 | 0.04 | 0.04 | 0.04 | 0.04 |
| θ22 deg | 60 | 85 | 60 | 60 | 60 | 60 |
| L22/Lc | 0.35 | 0.35 | 0.65 | 0.50 | 0.50 | 0.50 |
| W23/W22 | 0.10 | 0.10 | 0.10 | 0.10 | 0.80 | 0.30 |
| θ23 deg | 60 | 85 | 60 | 60 | 60 | 60 |
| DRY STEERING STABILITY PERFORMANCE | 96 | 98 | 95 | 101 | 98 | 101 |
| WET STEERING STABILITY PERFORMANCE | 115 | 113 | 113 | 113 | 116 | 114 |

FIG. 8C

US 11,945,263 B2

PNEUMATIC TIRE

TECHNICAL FIELD

The technology relates to a pneumatic tire and particularly relates to a pneumatic tire that can provide dry steering stability performance and wet steering stability performance in a compatible manner.

BACKGROUND ART

There has been a demand for improving the sports performance of recent pneumatic tires not only during circuit traveling but also during traveling in a city area and on a highway. Thus, there is a demand for providing dry performance and wet performance of a tire in a compatible manner. The technologies described in Japan Patent Nos. 4755709 and 5629283 have been known as conventional pneumatic tires that address this demand.

SUMMARY

The technology provides dry steering stability performance and wet steering stability performance in a compatible manner.

A pneumatic tire according to the technology includes a plurality of circumferential main grooves extending in a tire circumferential direction, and a land portion defined by the plurality of circumferential main grooves adjacent to each other, the land portion including a chamfered portion formed on an edge portion of the land portion on a tire ground contact edge side, and a lug groove and a narrow groove disposed correspondingly to the chamfered portion, the chamfered portion having a chamfered width that increases toward the tire circumferential direction on a road contact surface of the land portion, the lug groove terminating in the land portion on one end, and being opened to a central portion of the chamfered portion in a longitudinal direction on an other end, and the narrow groove being opened to an edge portion of the land portion on a tire equatorial plane side on one end, and terminating in a vicinity of a maximum width position of the chamfered portion or being connected to the maximum width position on an other end.

In the pneumatic tire according to the technology, the lug groove, which is opened to the central portion of the chamfered portion and is laterally wide, and the narrow groove, which is terminated in or opened to the maximum width position of the chamfered portion and is laterally narrow, are opened. Thus, the following advantages are achieved. Specifically, (a) as compared to a configuration in which all the grooves disposed in the land portion are laterally wide, rigidity of the land portion is secured to secure dry performance of the tire. Further, (b) as compared to a configuration in which all the grooves disposed in the land portion are narrow grooves or narrow sipes, drainage properties of the land portion 32 are increased to improve wet steering stability performance of the tire.

BRIEF DESCRIPTION OF DRAWINGS

FIGS. 8A-8C include a table showing the results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology and obviously substitutable elements. Furthermore, the modified examples described in the embodiments can be combined as desired within the scope apparent to one skilled in the art.

Pneumatic Tire

Figure 1:
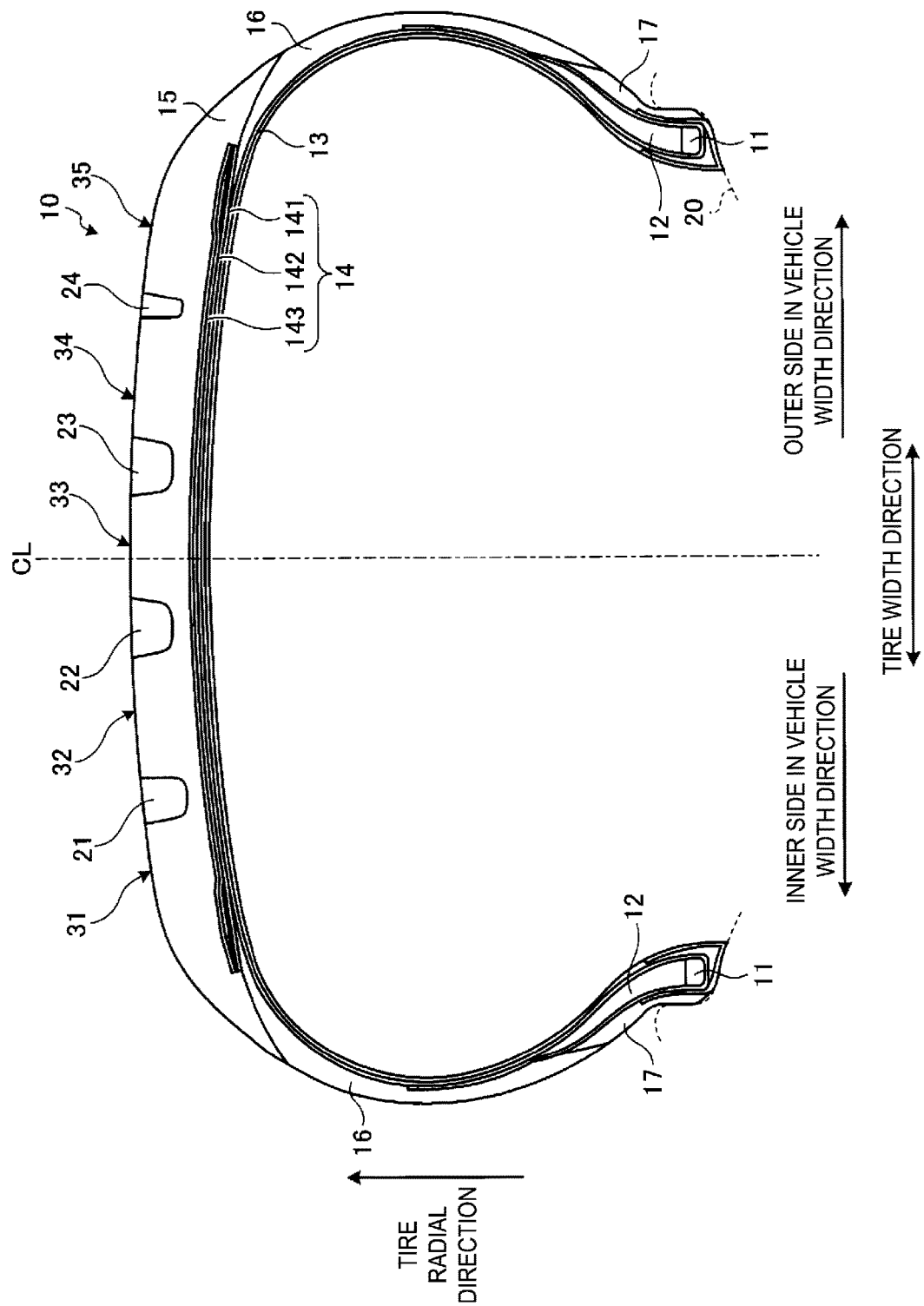
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. FIG. 1 illustrates a cross-sectional view of a half region in the tire radial direction. FIG. 1 also illustrates a radial tire for a passenger vehicle as an example of a pneumatic tire.

In reference to the same drawing, "cross section in a tire meridian direction" refers to a cross section of the tire taken along a plane that includes the tire rotation axis (not illustrated). Reference sign CL denotes the tire equatorial plane and refers to a plane normal to the tire rotation axis that passes through the central point of the tire in the tire rotation axis direction. "Tire width direction" refers to the direction parallel with the tire rotation axis. "Tire radial direction" refers to the direction perpendicular to the tire rotation axis.

Furthermore, an inner side in a vehicle width direction and an outer side in the vehicle width direction are defined with respect to the vehicle width direction in a case where the tire is mounted on a vehicle. Additionally, left and right regions demarcated by the tire equatorial plane are defined as an outer region in a vehicle width direction and an inner region in the vehicle width direction. Further, the pneumatic tire includes a mounting direction indicator portion (not illustrated) that indicates the tire mounting direction with respect to a vehicle. The mounting direction indicator portion, for example, is composed of a mark or recesses/protrusions on a sidewall portion of the tire. For example, Economic Commission for Europe Regulation 30 (ECE R30) stipulates that the vehicle mounting direction indicator portion be provided on the sidewall portion on the outer side in the vehicle width direction in a case where the tire is mounted on a vehicle.

A pneumatic tire 10 has an annular structure with the tire rotation axis as its center, and includes a pair of bead cores 11 and 11, a pair of bead fillers 12 and 12, a carcass layer 13, a belt layer 14, a tread rubber 15, a pair of sidewall rubbers 16 and 16, and a pair of rim cushion rubbers 17 and 17 (see FIG. 1).

The pair of bead cores 11 and 11 is formed by winding one or a plurality of bead wires made of steel multiple times in an annular shape, and is embedded in the bead portion to constitute a core of the left and right bead portions. The pair of bead fillers 12 and 12 is disposed outward of the pair of bead cores 11 and 11 in the tire radial direction and reinforces the bead portions.

The carcass layer 13 has a single layer structure made from one carcass ply or a multilayer structure made from a plurality of stacked carcass plies and spans between the left and right bead cores 11 and 11 in a toroidal shape to form the framework of the tire. Additionally, both ends of the carcass layer 13 are turned back to the outer side in the tire width direction so as to wrap around the bead cores 11 and the bead fillers 12 and fixed. The carcass ply of the carcass layer 13 is formed by performing a rolling process on coating rubber-covered carcass cords made from steel or an organic fiber material (for example, aramid, nylon, polyester, or rayon) and has a carcass angle (defined as the inclination angle in the longitudinal direction of the carcass cords with respect to the tire circumferential direction) ranging from 80 deg to 90 deg as an absolute value.

The belt layer 14 is a multilayer structure including a pair of cross belts 141, 142 and a belt cover 143 and is disposed around the outer circumference of the carcass layer 13. The pair of cross belts 141, 142 is made by performing a rolling process on coating rubber-covered belt cords made of steel or an organic fiber material. The cross belts 141, 142 have a belt angle, as an absolute value, ranging from 20 deg to 55 deg. Furthermore, the pair of cross belts 141, 142 have belt angles (defined as the inclination angle in the longitudinal direction of the belt cords with respect to the tire circumferential direction) of opposite signs and are stacked so that the longitudinal directions of the belt cords intersect each other (a so-called crossply structure). The belt cover 143 is made by coating belt cover cords made from steel or an organic fiber material with a coating rubber and has a belt angle ranging from 0 deg to 10 deg in an absolute value. Additionally, the belt cover 143 is, for example, a strip material formed by coating one or a plurality of belt cover cords with coating rubber, where the strip material is spirally wound around outer circumferential surfaces of the cross belts 141, 142 multiple times in the tire circumferential direction.

The tread rubber 15 is disposed outward of the carcass layer 13 and the belt layer 14 in the tire radial direction and constitutes a tread portion. The pair of sidewall rubbers 16 and 16 are disposed on the outer side of the carcass layer 13 in the tire width direction and constitute left and right sidewall portions. The pair of rim cushion rubbers 17 and 17 are disposed on an inner side in the tire radial direction of the turned back portions of the carcass layer 13 and the left and right bead cores 11 and 11 to form a rim fitting surface of the bead portion.

Tread Pattern

Figure 2:
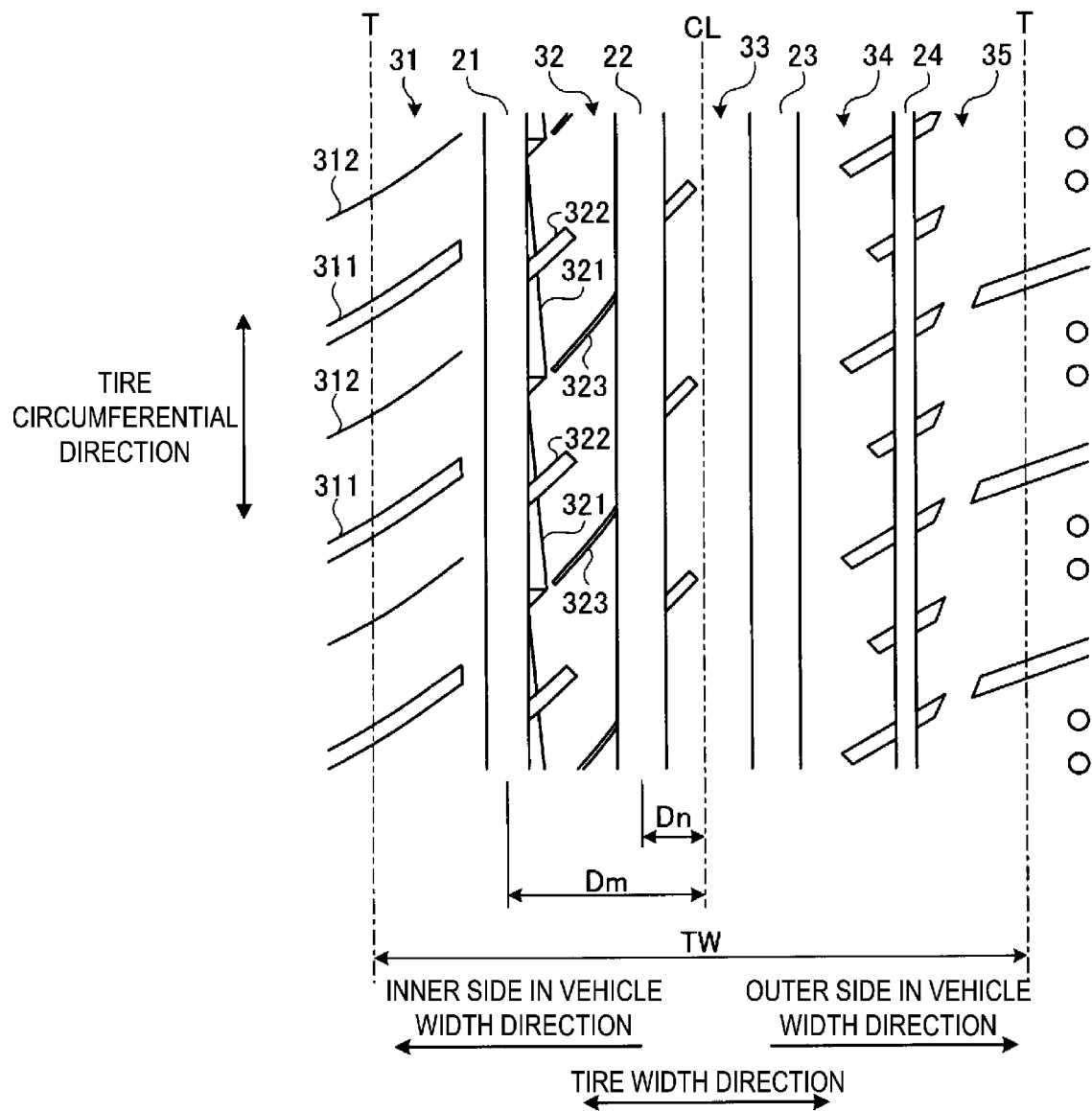
FIG. 2 is a plan view illustrating a tread surface of the pneumatic tire illustrated in FIG. 1.

FIG. 2 is a plan view illustrating a tread surface of the pneumatic tire illustrated in FIG. 1. FIG. 2 illustrates a tread pattern for an all-season tire. In reference to FIG. 2, "tire circumferential direction" refers to the direction revolving about the tire rotation axis. Reference sign T denotes a tire ground contact edge, and dimension sign TW denotes a tire ground contact width.

As illustrated in FIG. 2, in a tread surface, the pneumatic tire 10 includes a plurality of circumferential main grooves 21 to 23 and a circumferential narrow groove 24, which extend in the tire circumferential direction, and a plurality of land portions 31 to 35 defined by the circumferential grooves 21 to 24.

"Main groove" refers to a groove on which a wear indicator must be provided as specified by JATMA (The Japan Automobile Tyre Manufacturers Association, Inc.), and typically has a groove width of 3.0 mm or greater and a groove depth of 6.0 mm or greater. Further, the lug grooves described below are lateral grooves extending in the tire width direction, and are open when the tire comes into contact with the ground to function as grooves. Additionally, the sipes described below are cuts formed in the tread contact surface and are distinguished from the lug grooves in that the sipes are closed when the tire comes into contact with the ground.

The groove width is the maximum distance between left and right groove walls at the groove opening portion and is measured when the tire is mounted on a specified rim, inflated to the specified internal pressure, and in an unloaded state. In a configuration in which the land portions include notch portions or chamfered portions in the edge portions thereof, the groove width is measured with reference to the intersection points between the tread contact surface and the extension lines of the groove walls as measurement points, in a cross-sectional view in which the groove length direction is a normal direction. In a configuration in which the grooves extend in a zigzag shape or a wave shape in the tire circumferential direction, the groove width is measured with reference to the center line of the oscillation of the groove walls as measurement points.

The groove depth is measured as the maximum distance from the tread contact surface to the groove bottom when the tire is mounted on a specified rim, inflated to the specified internal pressure, and in an unloaded state. Additionally, in a configuration in which the grooves include a partially uneven portion or sipes on the groove bottom, the groove depth is measured excluding these portions.

"Specified rim" refers to a "standard rim" defined by JATMA, a "Design Rim" defined by TRA (The Tire and Rim Association, Inc.), or a "Measuring Rim" defined by ETRTO (The European Tyre and Rim Technical Organisation). Additionally, "specified internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a passenger vehicle tire, the specified internal pressure is an air pressure of 180 kPa, and the specified load is 88% of the maximum load capacity.

For example, in the configuration of FIG. 2, the pneumatic tire 10 has a left-right asymmetric tread pattern having a center point on the tire equatorial plane CL. Further, when the tire equatorial plane CL is a demarcation, the inner region in the vehicle width direction has the two circumferential main grooves 21 and 22, and the outer region in the vehicle width direction has the one circumferential main groove 23 and the one circumferential narrow groove 24. Further, the circumferential grooves 21, 22; 23, 24 are disposed being substantially left-right symmetric with respect to the tire equatorial plane CL as a center. Further, five land portions 31 to 35 are defined by the circumferential grooves 21 to 24. In addition, one land portion 33 is disposed on the tire equatorial plane CL.

Further, the land portions 31 and 35 on the outer side in the tire width direction, which are defined by the outermost circumferential main groove 21 in the inner region in the vehicle width direction and the circumferential narrow groove 24 in the outer region in the vehicle width direction, are defined as shoulder land portions. Each of the shoulder land portions 31 and 35 is a land portion on the outermost side in the tire width direction, and is located on the tire ground contact edge T. Further, the land portions 32 and 34 located on the inner side in the tire width direction defined in the outermost circumferential main groove 21 or the circumferential narrow groove 24 are defined as second land portions. Accordingly, the second land portions 32, 34 are adjacent to the shoulder land portions 31, 35 with the outermost circumferential main grooves 21, 24 disposed therebetween. Furthermore, the land portion 33 located closer to the tire equatorial plane CL than the second land portions 32, 34 is defined as a center land portion.

Inner Region in Vehicle Width Direction

Figure 3:
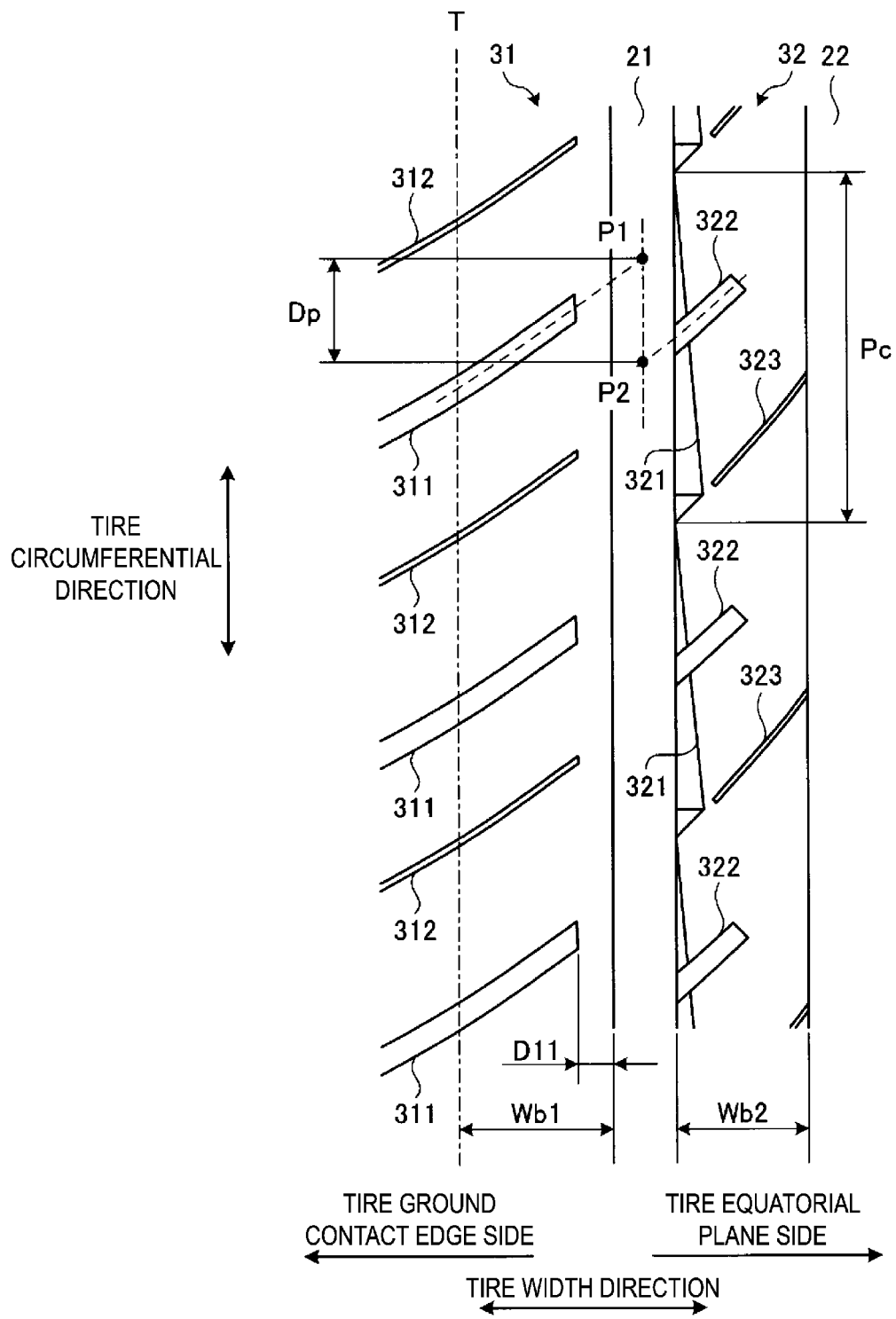
FIG. 3 is an enlarged plan view illustrating a second land portion and a shoulder land portion, which are illustrated in FIG. 2, in an inner region in a vehicle width direction.

FIG. 3 is an enlarged plan view illustrating the second land portion and the shoulder land portion in the inner region in the vehicle width direction, which are illustrated in FIG. 2.

In the configuration of FIG. 2, the inner region in the vehicle width direction having the tire equatorial plane CL as a demarcation includes the two circumferential main grooves 21 and 22, and the shoulder land portion 31, the second land portion 32, and the center land portion 33 defined by the circumferential main grooves 21 and 22.

The two circumferential main grooves 21 and 22 each have a straight shape having a constant groove width. Further, a distance Dm from the tire equatorial plane CL to the groove center line of the outermost circumferential main groove 21 is in a range of from 8% to 12% of the tire ground contact width TW. Further, a distance Dn from the tire equatorial plane CL to the groove center line of the other circumferential main groove 22 is in a range of from 26% to 32% of the tire ground contact width TW.

The groove center line of the circumferential main groove is defined as a straight line parallel to the tire circumferential direction passing through the midpoint of the left and right measurement points of the groove width of the circumferential main groove.

The tire ground contact width TW is measured as the maximum linear distance in the tire axial direction of a contact surface between the tire and a flat plate when the tire is mounted on a specified rim, inflated to the specified internal pressure, placed perpendicular to the flat plate in a static state, and loaded with a load corresponding to a specified load.

The tire ground contact edge T is defined as the maximum width position in the tire axial direction of the contact surface between the tire and a flat plate when the tire is mounted on a specified rim, inflated to the specified internal pressure, placed perpendicular to the flat plate in a static state, and loaded with a load corresponding to the specified load.

Further, the groove width of each circumferential main groove 21 and 22 is in a range of from 5.0 mm to 25.0 mm, and the groove depth thereof is in a range of from 5.0 mm to 12.0 mm (dimension symbol omitted in drawings).

Inner Shoulder Land Portion

As illustrated in FIG. 3, the shoulder land portion 31 includes lug grooves 311 and narrow grooves 312. Each of the lug grooves 311 and the narrow grooves 312 terminates in the shoulder land portion 31 without penetrating the shoulder land portion 31 at one end, and extends in the tire width direction to intersect the tire ground contact edge T. With this, the edge portion of the shoulder land portion 31 on the outermost circumferential main groove 21 side has a plane structure without a groove or an opening portion of a sipe, and extends continuously in the tire circumferential direction. Thus, noise performance of the tire is enhanced.

Further, a distance D11 between the lug groove 311 and the narrow groove 312, and the edge portion of the shoulder land portion 31 preferably has a relationship of $0.10 \le D11/Wb1 \le 0.40$ with respect to a ground contact width Wb1 of the shoulder land portion 31, and more preferably a relationship of $0.15 \le D11/Wb1 \le 0.25$.

The land portion ground contact width is measured as the maximum linear distance in the tire axial direction of a contact surface between the tire and a flat plate when the tire is mounted on a specified rim, inflated to the specified internal pressure, placed perpendicular to the flat plate in a static state, and loaded with a load corresponding to a specified load.

Further, the ground contact width Wb1 of the shoulder land portion 31 preferably has a relationship of $0 \le Wb1/TW \le 0.30$ with respect to the tire ground contact width TW.

Further, in the configuration in FIG. 3, the lug groove 311 and the narrow groove 312 each have an arc shape gently curved in the tire circumferential direction. However, the shape is not limited thereto, and the lug groove 311 and the narrow groove 312 may have a linear shape and may extend in substantially parallel with the tire width direction (not illustrated). Further, the plurality of lug grooves 311 and narrow grooves 312 are alternately disposed at a predetermined pitch in the tire circumferential direction. However, the grooves are not limited thereto, and the plurality of narrow grooves 312 may be disposed between adjacent lug grooves 311 and 311 (not illustrated).

Inner Second Land Portion

Figure 4:
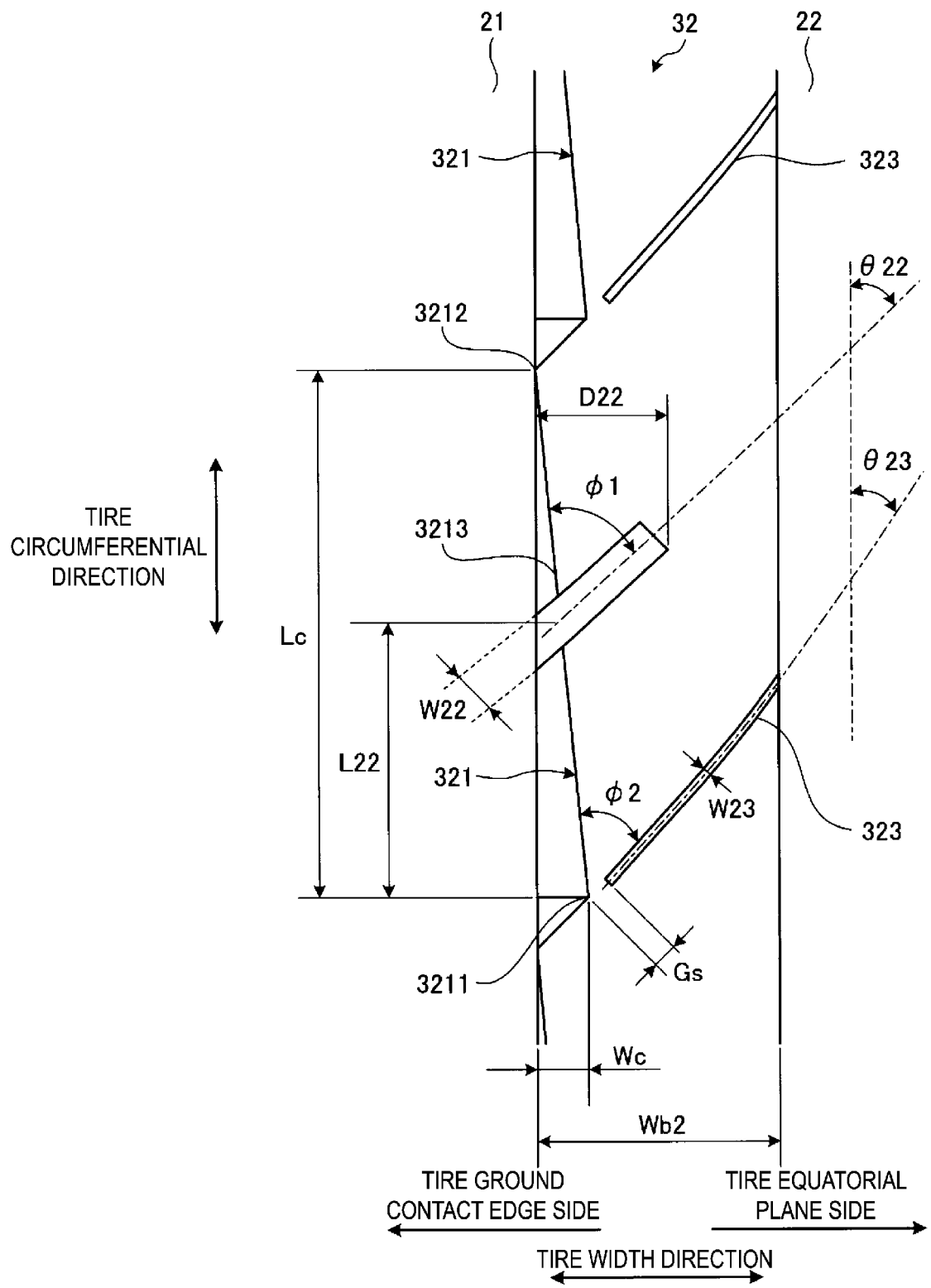
FIG. 4 is an enlarged plan view illustrating the second land portion illustrated in FIG. 3.
Figure 5:
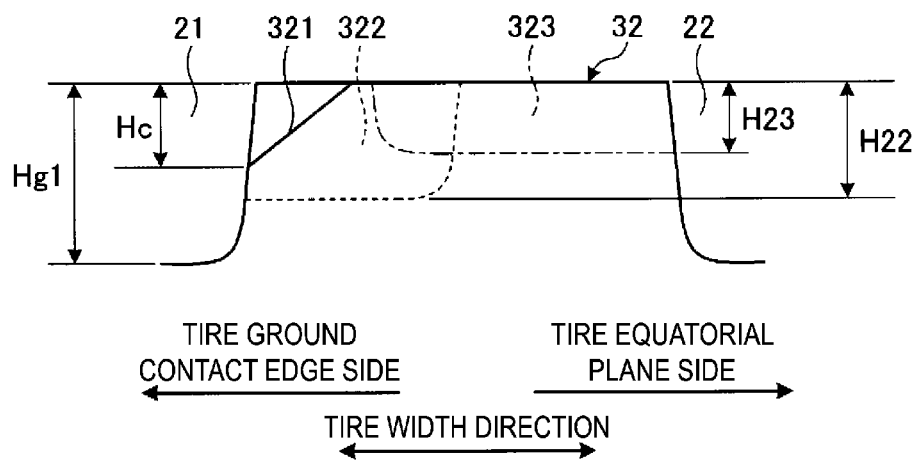
FIG. 5 is a cross-sectional view illustrating the second land portion illustrated in FIG. 3.

FIGS. 4 and 5 are an enlarged plan view (FIG. 4) and a cross-sectional view (FIG. 5) illustrating the second land portion illustrated in FIG. 3.

As illustrated in FIG. 3, the second land portion 32 includes chamfered portions 321, and lug grooves 322 and narrow grooves 323 (first and second lateral grooves) having different groove widths.

The chamfered portion 321 is formed on the edge portion of the second land portion 32 on the tire ground contact edge T side (that is, the outermost circumferential main groove 21 side), and connects the road contact surface of the second land portion 32 and the groove wall surface of the outermost circumferential main groove 21 to each other with a flat surface or a curved surface. Further, the chamfered portion 321 has a shape having a chamfered width Wc (see FIG. 4) that increases toward the tire circumferential direction in the road contact surface of the second land portion 32. Additionally, the plurality of chamfered portions 321 are disposed at a predetermined pitch in the tire circumferential direction. The chamfered portions 321 increase the groove volume of the outermost circumferential main groove 21 to thereby enhance wet performance of the tire.

Further, the maximum width Wc of the chamfered portion 321 with respect to a maximum width Wb2 of the second land portion 32 preferably has a relationship of $0.05 \le Wc/Wb2 \le 0.30$, more preferably, a relationship of $0.15 \le Wc/Wb2 \le 0.25$.

The width of the chamfered portion is measured as a distance from the edge portion of the land portion to the ridge line of the chamfered portion in the road contact surface of the land portion in the tire width direction. Further, the edge portion of the land portion is defined as an intersection point between the extension line of the groove wall of the circumferential main groove and the road contact surface of the land portion. The ridge line of the chamfered portion is defined as a boundary line between the wall surface of the chamfered portion and the road contact surface of the land portion.

Additionally, the ground contact width Wb2 of the second land portion 34 preferably has a relationship of 0.70≤Wb2/Wb1≤1.20 with respect to the ground contact width Wb1 of the shoulder land portion 35, more preferably, a relationship of 0.90≤Wb2/Wb1≤1.00. With this, the ground contact widths Wb1 and Wb2 of the left and right land portions 31 and 32 defined in the circumferential main grooves 21 and 22 are optimized.

Further, in FIG. 4, a maximum length Lc from a maximum width position 3211 to a minimum width position 3212 of the chamfered portion 321 in the tire circumferential direction preferably has a relationship of 0.60≤Lc/Pc≤1.00 with respect to a pitch length Pc of the chamfered portion 321 (see FIG. 3) and more preferably a relationship of 0.80≤Lc/Pc≤0.95. With this, the increased width region of the chamfered width Wc is secured appropriately. Note that the chamfered portions 321 and 321 adjacent to each other in the tire circumferential direction may be connected to each other or be separated from each other, assuming that the condition of the ratio Lc/Pc described above is satisfied.

Further, in FIG. 5, a maximum depth Hc of the chamfered portion 321 preferably has a relationship of 0.20≤Hc/Hg1≤0.70 with respect to a maximum depth Hg1 of the circumferential main groove 21 and more preferably a relationship of 0.30≤Hc/Hg1≤0.50.

For example, in the configurations in FIGS. 4 and 5, the chamfered portion 321 has a triangular pyramid shape with the minimum width position 3212 as an apex. Further, as illustrated in FIG. 4, the chamfered portion 321 further has a triangular shape obtained by connecting, at the road contact surface of the second land portion 32, a long portion (portion constituted by reference signs 3213 and 3214) and a short portion (reference sign omitted in drawings) to each other. The chamfered portion width of the chamfered portion 321 gradually increases at the long portion toward one direction in the tire circumferential direction. Further, as illustrated in FIG. 5, the chamfered portion 321 is a corner chamfer and connects the road contact surface of the second land portion 32 and the groove wall surface of the outermost circumferential main groove 21 to each other with a flat surface. However, the chamfered portion 321 is not limited thereto. The chamfered portion 321 may be a rounded chamfer and may connect the road contact surface of the second land portion 32 and the groove wall surface of the outermost circumferential main groove 21 to each other with a curved surface. Further, the adjacent chamfered portions 321 and 321 are disposed continuously without a gap therebetween. With this, the ridge line of the chamfered portion 321 has a zigzag shape extending along the edge portion of the second land portion 32 in the tire circumferential direction.

The lug groove 322 is a first lateral groove disposed correspondingly to the chamfered portion 321. As illustrated in FIG. 3, the lug groove 322 terminates in the second land portion 32 at one end and is opened to a central portion of the chamfered portion 321 in a longitudinal direction to communicate with the outermost circumferential main groove 21 at the other end.

Further, in FIG. 4, an extension length D22 of the lug groove 322 in the tire width direction preferably has a relationship of 0.20≤D22/Wb2≤0.80 with respect to the maximum width Wb2 of the second land portion 32 and more preferably a relationship of 0.40≤D22/Wb2≤0.60. Therefore, the lug groove 322 preferably terminates at a substantially central portion of the second land portion 32.

The extension length of the lug groove is measured as a distance from the edge portion of the land portion on the circumferential main groove side to the terminating end portion of the lug groove in the tire width direction.

Further, a maximum groove width W22 of the lug groove 322 preferably has a relationship of 0.03≤W22/Lc≤0.10 with respect to the maximum length Lc from the maximum width position 3211 to the minimum width position 3212 of the chamfered portion 321 in the tire circumferential direction and more preferably has a relationship of 0.04≤W22/Lc≤0.07. Further, the maximum groove width W22 of the lug groove 322 is preferably in a range of 2.5 mm≤W22≤6.5 mm.

The maximum groove width of the lug groove is measured as a maximum width of the lug groove on the road contact surface of the land portion. When the lug groove is a chamfered sipe as described below, the maximum groove width is measured as a maximum groove width including a chamfered portion.

In addition, an inclination angle θ22 of the lug groove 322 with respect to the tire circumferential direction is preferably in a range of 30 deg≤θ22≤85 deg, more preferably, a range of 50 deg≤θ22≤70 deg.

The inclination angle of the lug groove is measured as an angle formed between an imaginary line connecting both ends of the lug groove and the tire circumferential direction.

Further, a distance L22 is a length from the maximum width position 3211 of the chamfered portion 321 to the opening position of the lug groove 322 in the chamfered portion 321 in the tire circumferential direction. The distance L22 preferably has a relationship of 0.35≤L22/Lc≤0.65 with respect to the maximum length Lc from the maximum width position 3211 to the minimum width position 3212 of the chamfered portion 321 in the tire circumferential direction, more preferably, a relationship of 0.40≤L22/Lc≤0.60. Therefore, the lug groove 322 is opened in the central portion of the chamfered portion 321 in the longitudinal direction.

Further, in FIG. 5, a maximum groove depth H22 of the lug groove 322 preferably has a relationship of 0.40≤H22/Hg1≤0.85 with respect to the maximum depth Hg1 of the circumferential main groove 21, more preferably, a relationship of 0.50≤H22/Hg1≤0.75. Further, as illustrated in FIG. 5, the maximum groove depth H22 of the lug groove 322 is set to be larger than the maximum depth Hc of the chamfered portion 321.

For example, in the configurations in FIGS. 4 and 5, the lug groove 322 has a short linear shape or a gentle arc shape, and is opened in a central portion of a long portion 3213 of the chamfered portion 321. Further, the number of disposed lug grooves 322 and the number of disposed chamfered portions 321 match, where a single lug groove 322 is opened to one chamfered portion 321. With this, the long portion 3213 of the chamfered portion 321 is divided by the lug groove 322 in the tire circumferential direction. Further, an inclination angle φ1 of the lug groove 322 with respect to the ridge line of the long portion 3213 of the chamfered portion 321 is in a range of 35 deg≤φ1≤80 deg.

The narrow groove 323 is a second lateral groove disposed correspondingly to the chamfered portion 321. The narrow groove 323 is opened to the edge portion of the second land portion 32 on the tire equatorial plane CL side at one end, and terminates in the vicinity of the maximum width position 3211 of the chamfered portion 321 at the other end. Further, as described below, the narrow groove 323 may be connected to the maximum width position 3211 of the chamfered portion 321 at the other end.

Additionally, in FIG. 4, a maximum groove width W23 of the narrow groove 323 preferably has a relationship of $0 \leq W23/W22 \leq 0.80$ with respect to the maximum groove width W22 of the lug groove 322, more preferably, a relationship of $0 \leq W23/W22 \leq 0.50$. Therefore, the groove width of the narrow groove 323 is set to be sufficiently narrow with respect to the groove width of the lug groove 322.

Additionally, the maximum groove width W23 of the narrow groove 323 is preferably in a range of 0.4 mm $\leq W23 \leq 1.5$ mm, more preferably, a range of 0.5 mm $\leq W23 \leq 1.0$ mm. Further, the narrow groove 323 is preferably a sipe that is closed when the tire comes into contact with the ground.

In addition, an inclination angle $\theta 23$ of the narrow groove 323 with respect to the tire circumferential direction is preferably in a range of 30 deg $\leq \theta 23 \leq 85$ deg, more preferably, a range of 50 deg $\leq \theta 23 \leq 70$ deg.

Further, a maximum groove depth H23 of the narrow groove 323 preferably has a relationship of $0.20 \leq H23/Hg1 \leq 0.70$ with respect to the maximum depth Hg1 of the circumferential main groove 21, more preferably, a relationship of $0.40 \leq H23/Hg1 \leq 0.60$. Further, the maximum groove depth H23 of the narrow groove 323 is set to be smaller than the maximum groove depth H22 of the lug groove 322.

For example, in the configurations in FIGS. 4 and 5, the narrow groove 323 has a short linear shape or a gentle arc shape. Further, the number of disposed narrow grooves 323 and the number of disposed chamfered portions 321 match, where a single narrow groove 323 is disposed to face one chamfered portion 321. Further, an inclination angle $\varphi 2$ of the narrow groove 323 with respect to the ridge line of the long portion 3213 of the chamfered portion 321 is in a range of 35 deg $\leq \varphi 2 \leq 80$ deg.

Further, as illustrated in FIG. 4, the narrow groove 323 terminates in the vicinity of the maximum width position 3211 of the chamfered portion 321. Further, a distance Gs between the terminating end portion of the narrow groove 323 and the maximum width position 3211 of the chamfered portion 321 is in a range of Gs $\leq 1.5$ mm. The configuration described above is preferable in that, during tire vulcanization molding, since a small gap can be formed between a molding blade of the narrow groove 323 and a molding blade of the chamfered portion 321 in the tire molding mold (not illustrated), vulcanization defects due to dead air space can be reduced. The lower limit of the distance Gs is not particularly limited, but when the distance Gs is 0.3 mm or greater, the air flow path is secured, and the effect of reducing vulcanization defects described above is secured.

Further, as illustrated in FIG. 4, only the narrow groove 323 having a small width is opened to the edge portion of the second land portion 32 on the tire equatorial plane CL side, and the other wide lateral grooves are not opened thereto. With this, rigidity of the edge portion of the second land portion 32 on the tire equatorial plane CL side is secured, and dry performance of the tire is enhanced.

Modified Examples

Figure 6:
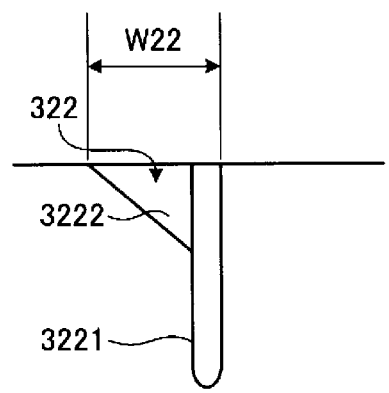
FIG. 6 is an explanatory diagram illustrating a modified example of a lug groove in the second land portion illustrated in FIG. 4.

FIG. 6 is an explanatory diagram illustrating a modified example of the lug groove in the second land portion illustrated in FIG. 4. FIG. 6 illustrates a cross-sectional view of the lug groove 322 in the depth direction.

In the configuration of FIG. 4, the lug groove 322 has a U-shaped cross-sectional shape (not illustrated) and has a substantially constant groove width from an early stage to a middle stage of wear. However, the lug groove 322 is not limited thereto and may be a chamfered sipe as illustrated in FIG. 6. Specifically, the lug groove 322 may be constituted of a sipe portion 3221, which is narrow and closed when the tire comes into contact with the ground, and a chamfered portion 3212, which is formed in an opening portion of the sipe portion 3221 to increase the groove width W22.

Figure 7:
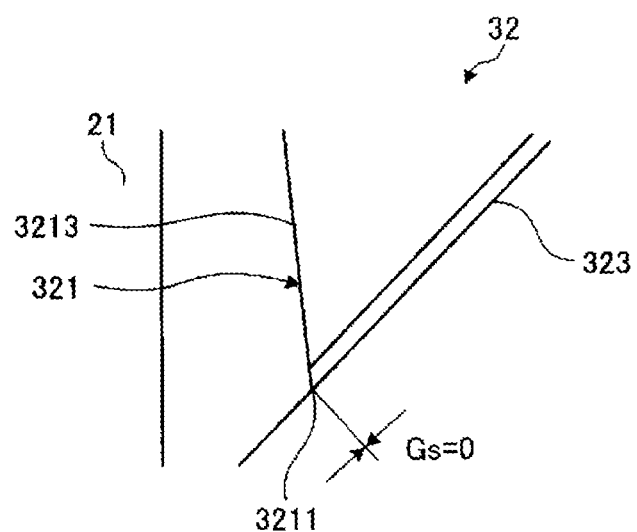
FIG. 7 is an explanatory diagram illustrating a modified example of a narrow groove in the second land portion illustrated in FIG. 4.

FIG. 7 is an explanatory diagram illustrating a modified example of the narrow groove in the second land portion illustrated in FIG. 4. FIG. 7 illustrates a positional relationship between the other end of the narrow groove 323 and the maximum width position 3211 of the chamfered portion 321.

In the configuration of FIG. 4, as described above, the narrow groove 323 terminates inside the second land portion 32 without being connected to the chamfered portion 321. Further, the gap (distance Gs) between the terminating end portion of the narrow groove 323 and the maximum width position 3211 of the chamfered portion 321 is secured appropriately. However, as illustrated in FIG. 7, the narrow groove 323 is not limited thereto, and may be connected to the maximum width position 3211 of the chamfered portion 321. Further, when the connection point between the narrow groove 323 and the chamfered portion 321 is separated from the maximum width position 3211 of the chamfered portion 321 by a distance range of 2.5 mm, it can be said that the narrow groove 323 is connected to the maximum width position 3211 of the chamfered portion 321.

Additional Items

As illustrated in FIG. 3, the chamfered portion 321 and the lug groove 322 of the second land portion 32 are disposed at substantially the same position as the lug groove 311 of the shoulder land portion 31 in the tire circumferential direction. Specifically, the entire lug groove 311 of the shoulder land portion 31 on the tire ground contact surface is within a range of the circumferential length Lc of the long portion 3213 of the chamfered portion 321 of the second land portion 32 (see FIG. 4). With this, drainage properties of the tire are enhanced.

Further, as illustrated in FIG. 3, the groove center line of the lug groove 322 of the second land portion 32 and the groove center line of the lug groove 311 of the shoulder land portion 31 are both inclined in the same direction, and are disposed to be offset with each other in the tire circumferential direction. Specifically, when intersection points P1 and P2 between the groove center lines of the lug grooves 311 and 322 and the groove center line of the outermost circumferential main groove 21 are defined, a distance Dp of the intersection points P1 and P2 in the tire circumferential direction with respect to the pitch length Pc of the chamfered portion 321 of the second land portion 32 is preferably in a range of $0 \leq Dp/Pc \leq 0.50$ and more preferably in a range of $0.10 \leq Dp/Pc \leq 0.40$. Further, the number of pitches of the lug grooves 311 of the shoulder land portion 31 and the number of pitches of the lug grooves 322 of the second land portion 32 are the same, and are in a range of from 20 to 80.

Effects

As described above, the pneumatic tire 10 includes the plurality of circumferential main grooves 21 and 22 extending in the tire circumferential direction and the land portion 32 defined by adjacent circumferential main grooves 21 and 22 (see FIG. 3). Further, the land portion 32 includes the chamfered portion 321 formed on the edge portion of the land portion 32 on the tire ground contact edge side, and the lug groove 322 and the narrow groove 323 disposed correspondingly to the chamfered portion 321 (see FIG. 4). Further, the chamfered portion 321 is formed on the edge portion of the land portion 32 on the tire ground contact edge T side, and has the chamfered width Wc increased toward the tire circumferential direction in the road contact surface of the land portion 32. Further, the lug groove 322 terminates in the land portion 32 on one end, and is opened to the central portion of the chamfered portion 321 in the longitudinal direction on the other end. Further, the narrow groove 323 is opened to the edge portion of the land portion 32 on the tire equatorial plane CL side on one end, and terminates in the vicinity of the maximum width position 3211 of the chamfered portion 321 (see FIG. 4) or is connected to the maximum width position 3211 on the other end (see FIG. 7).

In the configuration described above, (1) the land portion 32 includes the chamfered portion 321 and the lug groove 322 formed on the edge portion on the tire ground contact edge T side, and thus drainage properties of the land portion 32 are increased to improve wet steering stability performance of the tire. Further, (2) the lug groove 322 does not penetrate the land portion 32, and thus rigidity of the land portion 32 is secured to ensure dry steering stability performance of the tire. Further, (3) the lug groove 322 is opened to the central portion of the chamfered portion 321 in the longitudinal direction, and thus drainage properties of the land portion 32 are increased to improve wet steering stability performance of the tire.

Further, (4) the lug groove 322, which is opened to the central portion of the chamfered portion 321 and is laterally wide, and the narrow groove 323, which terminates in or is opened to the maximum width position 3211 of the chamfered portion 321 and is laterally narrow, are provided, and thus the following advantages are achieved. Specifically, (a) as compared to a configuration in which all the grooves disposed in the land portion 32 are laterally wide (not illustrated), rigidity of the land portion 32 is secured to ensure dry performance of the tire. Further, (b) as compared to a configuration in which all the grooves disposed in the land portion 32 are narrow grooves or narrow sipes (not illustrated), drainage properties of the land portion 32 are increased to improve wet steering stability performance of the tire. Further, (c) as compared to a configuration in which a wide lug groove is opened to the maximum width position of the chamfered portion or a narrow groove or a narrow sipe terminates or is opened to the central portion of the chamfered portion (not illustrated), rigidity of the land portion 32 at the maximum width position 3211 of the chamfered portion 321 can be secured while securing drainage function from the lug groove 322 to the chamfered portion 321. This affords the advantage of providing both dry steering stability performance and wet steering stability performance of the tire in a compatible manner.

Further, in the pneumatic tire 10, the maximum width Wc of the chamfered portion 321 has a relationship of $0.05 \leq Wc/Wb2 \leq 0.30$ with respect to the maximum width Wb2 of the land portion 32 (see FIG. 4). The lower limit described above provides an advantage of securing a function of improving drainage properties due to the chamfered portion 321 and the upper limit described above provides an advantage of securing rigidity of the land portion 32.

Further, in the pneumatic tire 10, the maximum length Lc from the maximum width position 3211 to the minimum width position 3212 of the chamfered portion 321 in the tire circumferential direction (see FIG. 4) has a relationship of $0.60 \leq Lc/Pc \leq 1.00$ with respect to the pitch length Pc of the chamfered portion 321 (see FIG. 3). The lower limit described above provides an advantage of securing a function of improving drainage properties due to the chamfered portion 321 and the upper limit described above provides an advantage of optimizing the planar form of the chamfered portion 321.

Further, in the pneumatic tire 10, the chamfered portion 321 has a triangular shape obtained by connecting the long portion and the short portion to each other on the road contact surface of the land portion 32 (see FIG. 3). With this, there is an advantage in improving drainage function due to the chamfered portion 321.

Further, in the pneumatic tire 10, the extension length D22 of the lug groove 322 in the tire width direction has a relationship of $0.20 \leq D22/Wb2 \leq 0.80$ (see FIG. 4) with respect to the maximum width Wb2 of the land portion 32. The lower limit described above provides an advantage of securing a function of improving drainage properties due to the lug groove 322 and the upper limit described above provides an advantage of securing rigidity of the land portion 32.

Further, in the pneumatic tire 10, the maximum groove width W22 of the lug groove 322 has a relationship of $0.03 \leq W22/Lc \leq 0.10$ with respect to the maximum length Lc from the maximum width position 3211 to the minimum width position 3212 of the chamfered portion 321 in the tire circumferential direction (see FIG. 4). The lower limit described above provides an advantage of securing a function of improving drainage properties due to the lug groove 322 and the upper limit described above provides an advantage of securing rigidity of the land portion 32.

Further, in the pneumatic tire 10, the inclination angle θ22 of the lug groove 322 with respect to the tire circumferential direction is in a range of $30 \text{ deg} \leq θ22 \leq 85 \text{ deg}$ (see FIG. 4). With this, there is an advantage in optimizing the inclination angle θ22 of the lug groove 322.

Further, in the pneumatic tire 10, the length L22 is a length from the maximum width position 3211 of the chamfered portion 321 to the opening position of the lug groove 322 with respect to the chamfered portion 321 in the tire circumferential direction. The length L22 has a relationship of $0.35 \leq L22/Lc \leq 0.65$ with respect to the maximum length Lc from the maximum width position 3211 to the minimum width position 3212 of the chamfered portion 321 in the tire circumferential direction (see FIG. 4). In the configuration described above, the lug groove 322 is opened to the central portion of the chamfered portion 321 in the longitudinal direction, and thus there is an advantage in further improving drainage function through combination of the lug groove 322 and the chamfered portion 321.

Further, in the pneumatic tire 10, the inclination angle θ23 of the narrow groove 323 with respect to the tire circumferential direction is in a range of $30 \text{ deg} \leq θ23 \leq 85 \text{ deg}$ (see FIG. 4). With this, there is an advantage in optimizing the inclination angle θ23 of the narrow groove 323.

Further, in the pneumatic tire 10, the maximum groove width W23 of the narrow groove 323 has a relationship of $0 \leq W23/W22 \leq 0.80$ with respect to the maximum groove width W22 of the lug groove 322. In the configuration described above, the groove width ratio between the lug groove 322 and the narrow groove 323 is optimized, and thus there is an advantage in optimizing the balance between a function of improving drainage properties due to the lug groove 322 and a function of reinforcing rigidity of the land portion due to the narrow groove 323.

Further, in the pneumatic tire 10, the maximum groove width W22 of the lug groove 322 is in a range of 2.5 mm≤W22≤6.5 mm (see FIG. 4). The lower limit described above provides an advantage of securing a function of improving drainage properties due to the lug groove 322 and the upper limit described above provides an advantage of securing rigidity of the land portion 32.

Further, in the pneumatic tire 10, the maximum groove width W23 of the narrow groove 323 is in a range of 0.4 mm≤W23≤1.5 mm (see FIG. 4). The lower limit described above provides an advantage of securing a function of improving drainage properties due to the narrow groove 323 and the upper limit described above provides an advantage of securing rigidity of the land portion 32.

Further, in the pneumatic tire 10, the distance Gs between the other end of the narrow groove 323 and the maximum width position 3211 of the chamfered portion 321 (see FIG. 4 and FIG. 7) is in a range of Gs≤1.0 mm. With this, an extension length of the narrow groove 323 is secured to ensure a function of improving drainage properties due to the narrow groove 323.

Further, in the pneumatic tire 10, the other end of the narrow groove 323 is disposed separated from the maximum width position 3211 of the chamfered portion 321 (see FIG. 4). The configuration described above is advantageous in that, during tire vulcanization molding, since a small gap can be formed between the molding blade of the narrow groove 323 and the molding blade of the chamfered portion 321 in the tire mold (not illustrated), vulcanization defects due to dead air space can be reduced.

Further, in the pneumatic tire 10, only the narrow groove 323 is opened to the edge portion of the land portion 32 on the tire equatorial plane CL side, and other wide lateral grooves (for example, the lug groove 322) are not opened thereto (see FIG. 4). With this, there are advantages in that rigidity of the edge portion of the land portion 32 on the tire equatorial plane CL side is secured and dry performance of the tire is enhanced.

Examples

FIGS. 8A-8C include a table showing results of performance tests of pneumatic tires according to the embodiment of the technology.

In the performance tests, (1) dry steering stability performance and (2) wet steering stability performance were evaluated for a plurality of types of test tires. Further, the test tires having a tire size of 245/40R18 97Y were assembled on a rim having a rim size of 18×8.5J, and an internal pressure and a load of specified by JATMA were applied to the test tires. Further, the test tires were mounted on all wheels of a passenger vehicle serving as a test vehicle.

(1) With regard to the evaluation of dry steering stability performance, the test vehicle traveled at a speed of from 60 km/h to 100 km/h on a flat circuit test course on dry road surfaces. Then, the test driver performed a sensory evaluation regarding steering when changing lanes and cornering, and stability when traveling straight. Results of the evaluation are expressed as index values and evaluated with Conventional Example 2 being assigned as the reference (100). In this evaluation, larger values are preferable. Moreover, when the evaluation is 98 or higher, it is deemed that dry performance is maintained.

(2) With regard to the evaluation of wet steering stability performance, the test vehicle traveled on a predetermined test course under rainy conditions, and lap time was measured. Then, the measurement results are expressed as index values and evaluated. Results of the evaluation are expressed as index values and evaluated with Conventional Example 2 being assigned as the reference (100). In this evaluation, larger values are preferable.

The test tires of Examples 1 to 14 included the configurations illustrated in FIGS. 1 to 3, and included the two circumferential main grooves 21 and 22, and the shoulder land portion 31 and the second land portion 32 in the inner region in the vehicle width direction having the tire equatorial plane CL as a demarcation. Further, the second land portion 32 included the chamfered portion 321, and first and second lateral grooves (the wide and non-through lug groove 322 and the narrow groove 323 having a small width) disposed correspondingly to the chamfered portion 321. Further, in FIG. 2, the tread width TW was 200 mm, the distance Dm of the circumferential main groove 21 on the tire ground contact edge T side was 60.0 mm, and the distance Dn of the circumferential main groove 22 on the tire equatorial plane CL side was 25.0 mm. Further, the groove width of the circumferential main grooves 21 and 22 was 15.0 mm, the width Wb1 of the shoulder land portion 31 was 36.0 mm, and the width Wb2 of the second land portion 32 was 27.0 mm. Further, the pitch length Pc of the chamfered portion 321 was 73 mm, and the number of pitches was 30. Further, the distance Ga between the chamfered portion 321 and the terminating end portion of the narrow groove 323 was 0 mm (see FIG. 7).

The test tires of Conventional Examples 1 and 2 and the Comparative Example were different from the test tire of Example 1 in terms of the configuration of the inner region in the vehicle width direction. Specifically, Conventional Example 1 did not include the first lateral groove (the lug groove 322) opened to the central portion of the chamfered portion 321 in the test tire of Example 1, and included a wide through lug groove in place of the second lateral groove (the narrow groove 323 having a small width) opened to the maximum width position 3211 of the chamfered portion 321. Conventional Example 2 did not include the first lateral groove (the lug groove 322) opened to the central portion of the chamfered portion 321 in the test tire of Example 1, and included only the second lateral groove (the narrow groove 323 having a small width) opened to the maximum width position 3211 of the chamfered portion 321.

As can be seen from the test results, it is understood that dry steering stability performance and wet steering stability performance of a tire are improved in the test tires of Examples 1 to 14.

The invention claimed is:

1. A pneumatic tire, comprising:
a plurality of circumferential main grooves extending in a tire circumferential direction; and
a land portion defined by the plurality of circumferential main grooves adjacent to each other,
the land portion comprising:
a chamfered portion formed on an edge portion of the land portion on a tire ground contact edge side; and
a lug groove and a narrow groove disposed correspondingly to the chamfered portion,
the chamfered portion having a chamfered width that increases toward the tire circumferential direction on a road contact surface of the land portion,
the lug groove terminating in the land portion on one end, and being opened to a central portion of the chamfered portion in a longitudinal direction on an other end, and
the narrow groove being opened to an edge portion of the land portion on a tire equatorial plane side on one end, and terminating in a vicinity of a maximum width position of the chamfered portion on an other end without connecting to the chamfered portion.

2. The pneumatic tire according to claim 1, wherein a maximum width Wc of the chamfered portion has a relationship of $0.05 \leq Wc/Wb2 \leq 0.30$ with respect to a maximum width Wb2 of the land portion.

3. The pneumatic tire according to claim 1, wherein a maximum length Lc from the maximum width position to a minimum width position of the chamfered portion in the tire circumferential direction has a relationship of $0.60 \leq Lc/Pc \leq 1.00$ with respect to a pitch length Pc of the chamfered portion.

4. The pneumatic tire according to claim 1, wherein the chamfered portion has a triangular shape obtained by connecting a long portion and a short portion to each other on the road contact surface of the land portion.

5. The pneumatic tire according to claim 1, wherein an extension length D22 of the lug groove in a tire width direction has a relationship of $0.20 \leq D22/Wb2 \leq 0.80$ with respect to a maximum width Wb2 of the land portion.

6. The pneumatic tire according to claim 1, wherein a maximum groove width W22 of the lug groove has a relationship of $0.03 \leq W22/Lc \leq 0.10$ with respect to the maximum length Lc from the maximum width position to the minimum width position of the chamfered portion in the tire circumferential direction.

7. The pneumatic tire according to claim 1, wherein an inclination angle θ22 of the lug groove with respect to the tire circumferential direction is in a range of $30 \text{ deg} \leq \theta 22 \leq 85 \text{ deg}$.

8. The pneumatic tire according to claim 1, wherein a distance L22 from the maximum width position of the chamfered portion to an opening position of the lug groove with respect to the chamfered portion in the tire circumferential direction has a relationship of $0.35 \leq L22/Lc \leq 0.65$ with respect to the maximum length Lc from the maximum width position to the minimum width position of the chamfered portion in the tire circumferential direction.

9. The pneumatic tire according to claim 1, wherein an inclination angle θ23 of the narrow groove with respect to the tire circumferential direction is in a range of $30 \text{ deg} \leq \theta 23 \leq 85 \text{ deg}$.

10. The pneumatic tire according to claim 1, wherein a maximum groove width W23 of the narrow groove has a relationship of $0 < W23/W22 \leq 0.80$ with respect to the maximum groove width W22 of the lug groove.

11. The pneumatic tire according to claim 1, wherein the maximum groove width W22 of the lug groove is in a range of $2.5 \text{ mm} \leq W22 \leq 6.5 \text{ mm}$.

12. The pneumatic tire according to claim 1, wherein the maximum groove width W23 of the narrow groove is in a range of $0.4 \text{ mm} \leq W23 \leq 1.5 \text{ mm}$.

13. The pneumatic tire according to claim 1, wherein a distance Gs between the other end of the narrow groove and the maximum width position of the chamfered portion is in a range of $Gs \leq 1.0 \text{ mm}$.

14. The pneumatic tire according to claim 1, wherein only the narrow groove is opened to the edge portion of the land portion on the tire equatorial plane side, and other lateral grooves wider than the narrow groove are not opened to the edge portion.

15. A pneumatic tire, comprising:
a plurality of circumferential main grooves extending in a tire circumferential direction; and
a land portion defined by the plurality of circumferential main grooves adjacent to each other,
the land portion comprising:
a chamfered portion formed only on one edge portion of the land portion on a tire ground contact edge side; and
a lug groove and a narrow groove disposed correspondingly to the chamfered portion,
the chamfered portion having a chamfered width that increases toward the tire circumferential direction on a road contact surface of the land portion,
the lug groove terminating in the land portion on one end, and being opened to a central portion of the chamfered portion in a longitudinal direction on an other end, and
the narrow groove being opened to an edge portion of the land portion on a tire equatorial plane side on one end, and terminating in a vicinity of a maximum width position of the chamfered portion or being connected to the maximum width position on an other end.

* * * * *